(12) United States Patent
Redaelli et al.

(10) Patent No.: US 12,086,435 B2
(45) Date of Patent: Sep. 10, 2024

(54) SELECTIVE DATA MAP UNIT ACCESS

(71) Applicant: Micron Technology, Inc., Boise, ID (US)

(72) Inventors: Marco Redaelli, Munich (DE); Gaurav Sinha, Oberschleißheim (DE)

(73) Assignee: Micron Technology, Inc., Boise, ID (US)

( * ) Notice: Subject to any disclaimer, the term of this patent is extended or adjusted under 35 U.S.C. 154(b) by 91 days.

(21) Appl. No.: 17/822,606

(22) Filed: Aug. 26, 2022

(65) Prior Publication Data
US 2024/0069766 A1 Feb. 29, 2024

(51) Int. Cl.
*G06F 3/06* (2006.01)
(52) U.S. Cl.
CPC .......... *G06F 3/0631* (2013.01); *G06F 3/0611* (2013.01); *G06F 3/0679* (2013.01)
(58) Field of Classification Search
CPC .... G06F 3/06; G06F 12/0806; G06F 12/0223; G06F 12/0284; G06F 12/0292; G06F 12/0828; G06F 12/085; G06F 12/0802; G06F 12/0815; G06F 12/0873; G06F 2212/314; G06F 2212/311; G06F 2212/313; G06F 2212/312; G06F 2212/621; G06F 2212/608
See application file for complete search history.

(56) References Cited

U.S. PATENT DOCUMENTS

| | | | | |
|---|---|---|---|---|
| 7,334,102 B1* | 2/2008 | Conway | ................. | G06F 9/526 |
| | | | | 711/151 |
| 7,457,880 B1* | 11/2008 | Kim | ..................... | G06F 3/0619 |
| | | | | 709/216 |
| 2004/0148479 A1* | 7/2004 | Patel | ..................... | G06F 3/0647 |
| | | | | 711/163 |
| 2023/0106463 A1* | 4/2023 | Kadaba Chaluvaiah | ................... | |
| | | | | G06F 3/0604 |
| | | | | 711/154 |

* cited by examiner

*Primary Examiner* — Khoa D Doan
(74) *Attorney, Agent, or Firm* — Harrity & Harrity, LLP

(57) ABSTRACT

Implementations described herein relate to selective data map unit access. A memory device may receive a request from a host device to access a resource associated with a data map unit. The memory device may identify whether the data map unit is in a locked state or an unlocked state. The data map unit may be in the locked state when another host device currently has exclusive access to the resource or may be in the unlocked state when no other host device currently has exclusive access to the resource. The memory device may selectively grant the host device exclusive access to the resource based on identifying whether the data map unit is in the locked state or the unlocked state.

25 Claims, 7 Drawing Sheets

100 →

SELECTIVE DATA MAP UNIT ACCESS

TECHNICAL FIELD

The present disclosure generally relates to memory devices, memory device operations, and, for example, to selective data map unit access.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
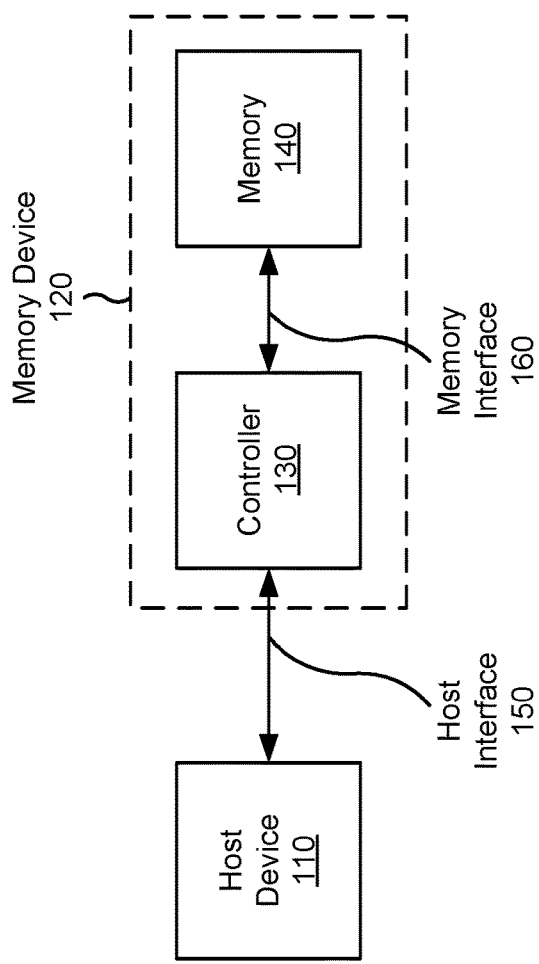
FIG. 1 is a diagram illustrating an example system capable of selective data map unit access.

Centralized storage may enable data sharing between functional systems. Memory resources may be shared among multiple host devices to enable data sharing for a memory device among the multiple host devices. In some cases, one or more virtual machines may be created based on the shared memory resources of a centralized storage system. For example, a first virtual machine associated with a first application may use a first portion of the memory resources of the centralized storage system, and a second virtual machine associated with a second application may use a second portion of the memory resources of the centralized storage system. In some cases, the first portion of the memory resources and the second portion of the memory resources may at least partially overlap. In some cases, the first application may be related to the second application. For example, the first application may correspond to a first functionality of an automobile, such as a back-up camera associated with the automobile, and the second application may correspond to a second functionality of the automobile, such as a cruise control functionality of the automobile.

In some cases, two or more host devices, such as two or more host devices using the centralized storage system, may communicate using Transmission Control Protocol/Internet Protocol (TCP/IP). TCP/IP is a suite of communication protocols that may be used to interconnect the host devices on the Internet or on a private computer network (e.g., an intranet or extranet). TCP/IP may specify how data is communicated by providing end-to-end communications that identify how the data should be broken into packets, addressed, transmitted, routed, and received at the destination, among other examples. TCP/IP may be based on two separate protocols. The TCP protocol defines how applications can create channels of communication across a network, and specifies how a message is assembled into smaller packets before the message is transmitted over the Internet and reassembled (in the right order) at the destination address. In contrast, the IP protocol defines how to address and route each packet to make sure the packets reach the right destination(s). Each gateway associated with the network may check this address (e.g., IP address) to determine where to forward the message to get the message to the destination address. In some cases, a subnet mask may identify which portion of the IP address is used to represent the network and which portion of the IP address is used to represent host devices, or other computers, on the network.

In some cases, the centralized storage system may be associated with a resource storage system, such as a specialized file system. The specialized file system may be used for data (and/or metadata) synchronization for TCP/IP communications. In some cases, the specialized file system may be a global file system, such as global file system 2 (GFS2). GFS2 is a shared-disk file system that allows all members of a cluster (e.g., all host devices) to have direct concurrent access to the same shared block storage. This is in contrast to distributed file systems, which distribute data throughout the cluster. GFS2 has no disconnected operating mode, and no client or server roles. Instead, all nodes in the GFS2 cluster function as peers. Using GFS2 in a cluster may require access hardware to allow access to the shared storage and/or a lock manager to control access to the storage. For example, the access hardware may identify whether a particular host device is allowed to access the shared storage (e.g., based on access rights) and the lock manager may identify whether the shared storage (or a portion of the shared storage) is locked, such as when another host device is currently using the shared storage.

In some cases, one or more memory locations (e.g., one or more memory cells, pages, sub-blocks, blocks, or planes, among other examples) of a memory device may be associated with one or more namespaces. The different memory locations of the memory device may be configured independently from each other within the respective namespaces. For example, memory locations associated with a first namespace may have a first configuration and/or may be associated with a first functionality of the memory device, and memory locations associated with a second namespace may have a second configuration and/or may be associated with a second functionality of the memory device. After one or more memory locations of the memory device are allocated to a respective namespace, a logical block address (LBA) in the namespace may logically represent the one or more memory locations within the namespace. An LBA may be used in different namespaces to identify different memory locations in different portions of the memory device. For example, a first namespace that is associated with a first portion of the memory device having n memory units may have LBAs ranging from 0 to n−1, and a second namespace that is associated with a second portion of the memory device having m memory units may have LBAs ranging from 0 to m−1.

A namespace may isolate the memory locations within the namespace from other memory locations of the memory device. In some cases, only one host device may be able to access a particular namespace at a given time. In one example, a controller associated with the memory device may receive a request from a first host device for exclusive access to the memory locations within a first namespace. The controller may grant the first host device exclusive access to memory locations associated with the first namespace, and may lock the first namespace. Locking the first namespace may include locking the LBA ranges associated with the memory locations within the first namespace. This may prevent the memory locations within the first namespace from being accessed by other host devices. For example, if a second host device attempts to access the first namespace (or the memory locations associated with the first namespace) while the first namespace is locked, the second host device may receive an error message. This may prevent the data that is stored within the memory locations of the first namespace from being corrupted. However, locking LBA ranges of the memory device may require a high level of complexity. Additionally, namespaces may correspond to large portions of memory, such as multiple gigabytes (GBs) of memory. Locking an entire LBA range associated with a namespace may be inefficient, particularly when the host device only needs to access a small portion of the memory locations (such as one or more files) within the namespace. This may result in wasted resources of the memory device, such as in applications where simultaneous file and metadata access is necessary.

Some implementations described herein enable selective data map unit access. The memory device may selectively lock and unlock access to resources in a resource storage system that is shared by a plurality of host devices. In some implementations, the memory device, such as a read/write lock (RWLOCK) controller associated with the memory device, may receive a request from a host device to access a resource associated with a data map unit, and may identify whether the data map unit is in a locked state or an unlocked state. The data map unit may be included in a data map that includes a plurality of data map units, where each data map unit corresponds to a resource (e.g., a file) or a portion of the resource (e.g., a portion of the file). The data map unit may be in the locked state when another host device currently has exclusive access to the resource or may be in the unlocked state when no other host device currently has exclusive access to the resource. The memory device may selectively grant the host device exclusive access to the resource based on identifying whether the data map unit is in the locked state or the unlocked state. For example, the memory device may grant the host device exclusive access to the resource based on the memory device identifying that the data map unit is in the unlocked state. Granting the host device exclusive access to the resource may include setting the data map unit to the locked state while the host device has exclusive access to the resource. Alternatively, the memory device may deny the host device exclusive access to the resource, or may add the request for exclusive access to the resource to a queue, based on the memory device identifying that the data map unit is in the locked state. As described above, locking an entire LBA range associated with a namespace may be inefficient, particularly when the host device only needs to access a portion of the memory locations (such as one or more files) within the namespace. This may result in wasted resources of the memory device. Using the techniques described herein, the memory device may lock one or more data map units. Locking the data map units, rather than locking the LBA ranges themselves, may allow more host devices to access the resource and may improve (e.g., reduce) the access time for the host devices to access the resource. Additional details are described herein.

FIG. 1 is a diagram illustrating an example system 100 capable of selective data map unit access. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to selectively lock and unlock access to one or more data map units associated with a resource storage system that is shared by a plurality of host devices 110. The memory device 120 and/or the controller 130 (e.g., an RWLOCK controller associated with the memory device 120) may receive a request from the host device 110 to access a resource associated with a data map unit, and may identify whether the data map unit is in a locked state or an unlocked state. The data map unit may be in the locked state when another host device 110 currently has an exclusive access to the resource or may be in the unlocked state when no other host device 110 currently has exclusive access to the resource. The memory device 120 and/or the controller 130 may selectively grant the host device 110 exclusive access to the resource based on identifying whether the data map unit is in the locked state or the unlocked state. For example, the memory device 120 and/or the controller 130 may grant the host device 110 exclusive access to the resource based on the memory device 120 and/or the controller 130 identifying that the data map unit is in the unlocked state. Alternatively, the memory device 120 and/or the controller 130 may deny the host device 110 exclusive access to the resource, or may add the request for exclusive access to the resource by the host device 110 to a queue, based on the memory device 120 and/or the controller 130 identifying that the data map unit is in the locked state. In some implementations, the data map unit may be in the "locked" state when access to the resource is locked, even though the resource (e.g., the LBA ranges associated with the file) may not be locked. Similarly, the data map unit may be in the unlocked state when the access to the resource is unlocked.

As indicated above, FIG. 1 is provided as an example. Other examples may differ from what is described with regard to FIG. 1.

Figure 2:
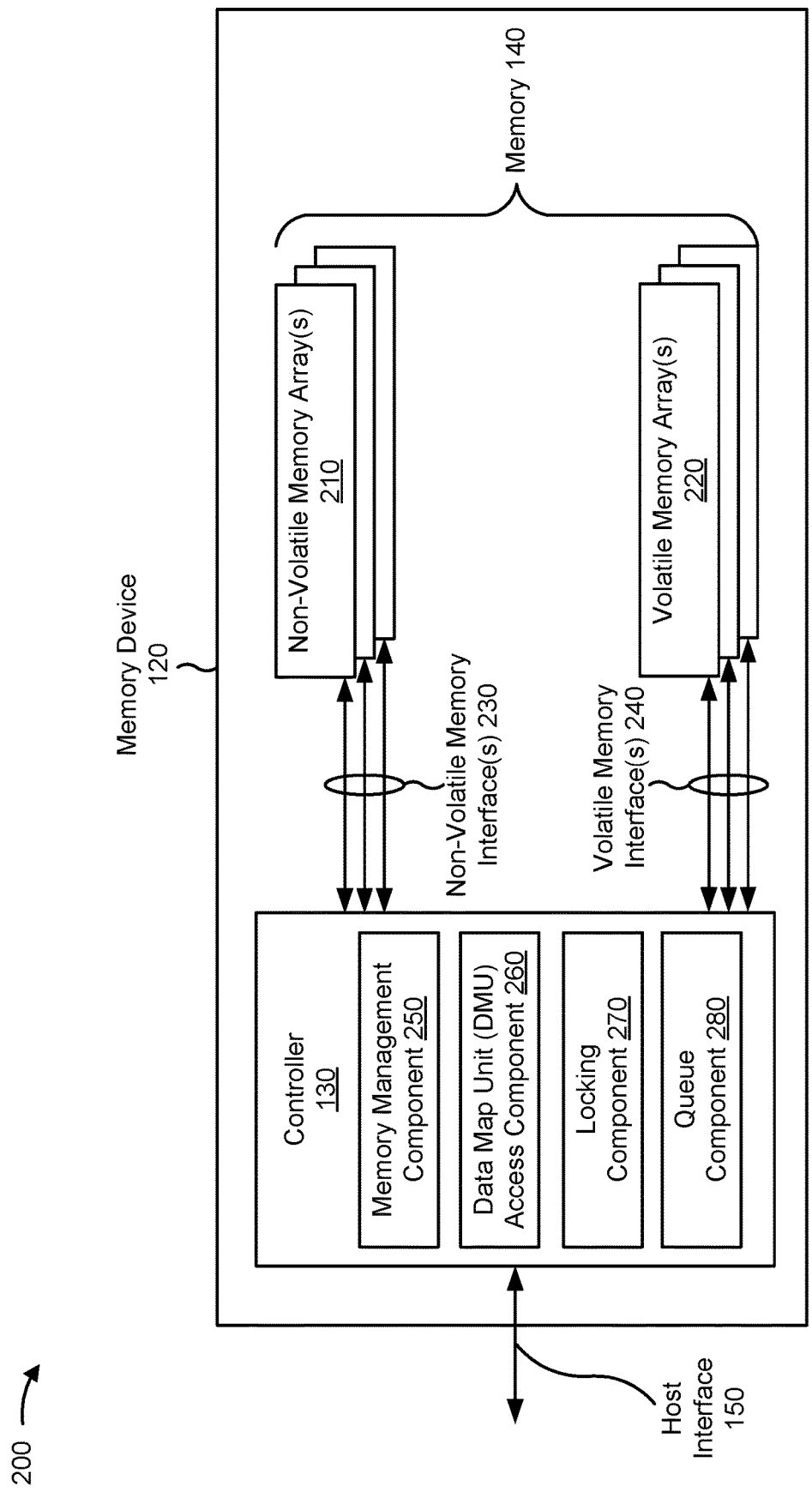
FIG. 2 is a diagram of example components included in a memory device.

FIG. 2 is a diagram of example 200 of components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 250, a data map unit (DMU) access component 260, a locking component 270, and/or a queue component 280. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The DMU access component 260 may be configured to manage (e.g., control) access to one or more data map units by one or more host devices 110. For example, the DMU access component 260 may grant access to a data map unit by the host device 110, deny access to the data map unit by the host device 110, or add the data map unit access request by the host device 110 to a queue. In some implementations, the DMU access component 260 may grant exclusive access to the data map unit by the host device 110 based on the data map unit being in an unlocked state (e.g., based on access to the resource being unlocked). The data map unit may be in the unlocked state based on no other host device 110 currently having exclusive access to the resource. Alternatively, the DMU access component 260 may deny the host device 110 exclusive access to the data map unit, or may add the request by the host device 110 for exclusive access to the data map unit to a queue, based on the data map unit being in a locked state (e.g., based on access to the resource being locked). The data map unit may be in the locked state based on another host device 110 currently having exclusive access to the resource.

The locking component 270 may be configured to lock access to the resource and/or unlock access to the resource based on one or more conditions. For example, the locking component 270 may obtain an indication that the host device 110 has been granted exclusive access to the resource. The locking component 270 may lock access to the resource by other host devices 110 based on the indication that the host device 110 has been granted exclusive access to the resource. Additionally, or alternatively, the locking component 270 may unlock access to the resource based on an indication that the host device 110 (or another host device) has released exclusive access to the resource by the host device 110. In some implementations, the locking component 270 may lock or unlock access to the resource based on information received from the DMU access component 260. For example, the locking component 270 may receive information from the DMU access component 260 indicating that the host device 110 has received exclusive access to the data map unit associated with the resource, or has surrendered exclusive access to the data map unit associated with the resource, and may lock the access to the data map unit, or unlock the access to the data map unit, based on the information. In some implementations, the locking component 270 may generate and/or transmit a key. For example, the locking component 270 may generate a key based on locking access to a data map unit. The locking component 270 (or other components of the memory device 120) may transmit an indication of the key to the host device 110 that has been granted exclusive access to the data map unit. The host device 110 may use the key to access the data map unit, and may surrender the key when the host device 110 releases exclusive access to the data map unit. Additional details regarding these features are described herein.

The queue component 280 may be configured to manage a queue for a plurality of locks associated with the plurality of resources that are shared by host devices 110. In some implementations, the queue component 280 may receive an indication (e.g., from the DMU access component 260) to add a request for exclusive access to a data map unit by the host device 110 to the queue. The indication may be received based on the data map unit being in a locked state. In some implementations, the queue component 280 may transmit an indication (e.g., to the DMU access component 260) that indicates a status of the queue. For example, the status of the queue may indicate that the queue is "available" based on a number of locks that are currently issued for the plurality of data map units being less than a threshold number of available locks, or may indicate that the queue is "full" based on the number of locks that are currently issued for the plurality of data map units being equal to the threshold number of available locks. The DMU access component 260 may indicate for the queue component 280 to add the request for exclusive access to the resource by the host device 110 to the queue based on the data map unit being in the locked state and based on the queue being in the available state. Alternatively, the DMU access component 260 may deny the host device 110 exclusive access to the resource based on the data map unit being in the locked state and based on the queue being in the full state. The queue component 280 may transmit an indication that the host device 110 may receive exclusive access to the resource based on another host device 110 (that currently has exclusive access to the resource) surrendering exclusive access to the resource and/or based on the host device 110 being next in the queue to receive exclusive access to the resource. Additional details regarding these features are described herein.

Figure 4:
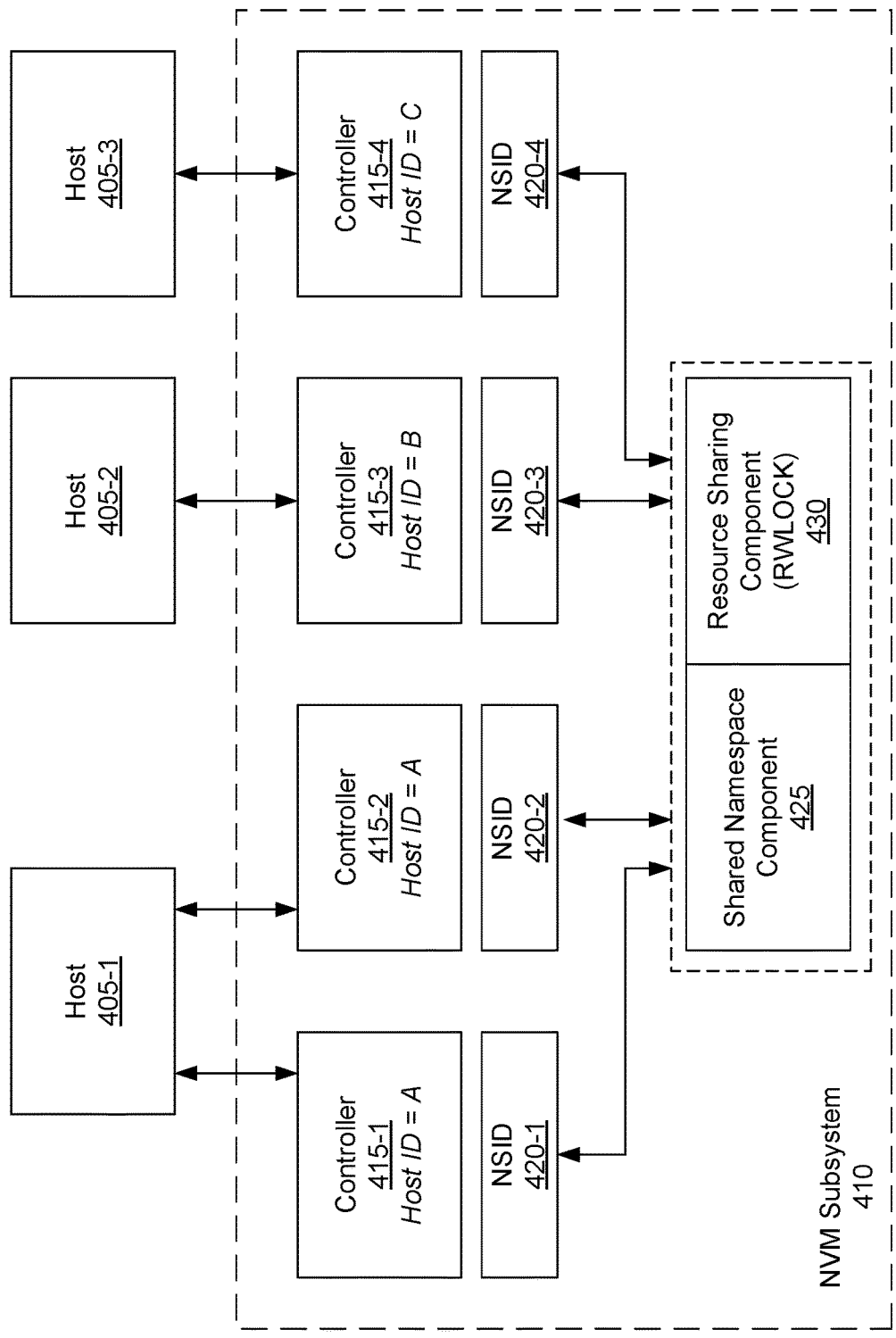
FIG. 4 is a diagram illustrating an example of selective data map unit access.
Figure 5:
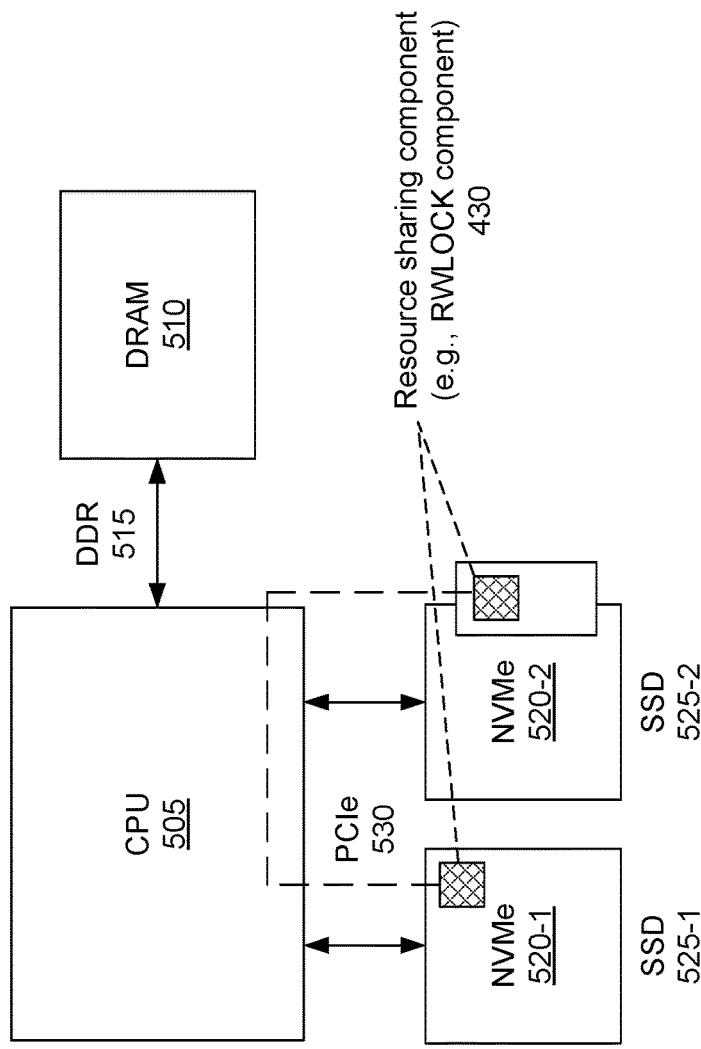
FIG. 5 is a diagram illustrating an example of a system for selective data map unit access.
Figure 7:
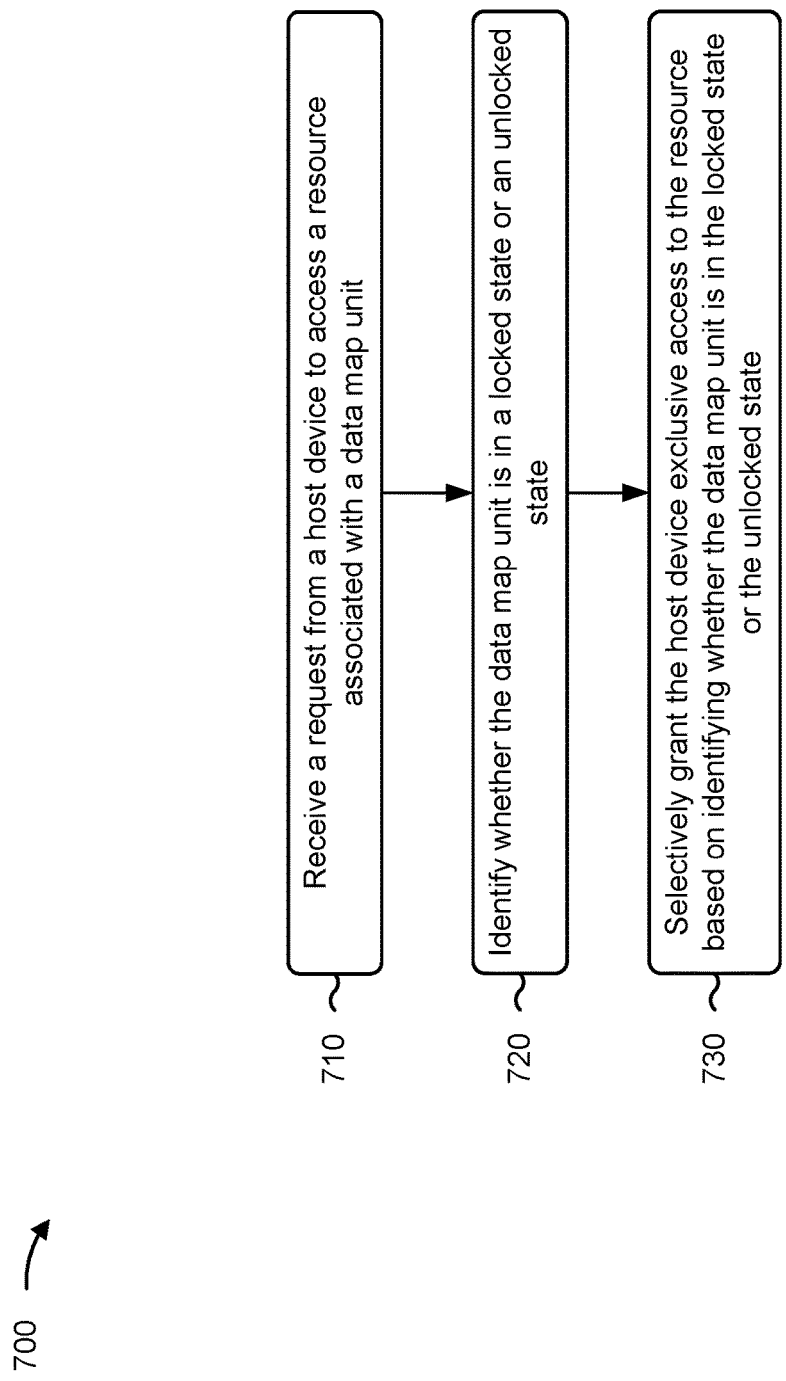
FIG. 7 is a flowchart of an example method associated with selective data map unit access.

One or more devices or components shown in FIG. 2 may be configured to perform operations described elsewhere herein, such as one or more operations of FIGS. 4-5 and/or one or more process blocks of the methods of FIG. 7. For example, the controller 130 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

As indicated above, FIG. 2 is provided as an example. Other examples may differ from what is described with regard to FIG. 2.

Figure 3:
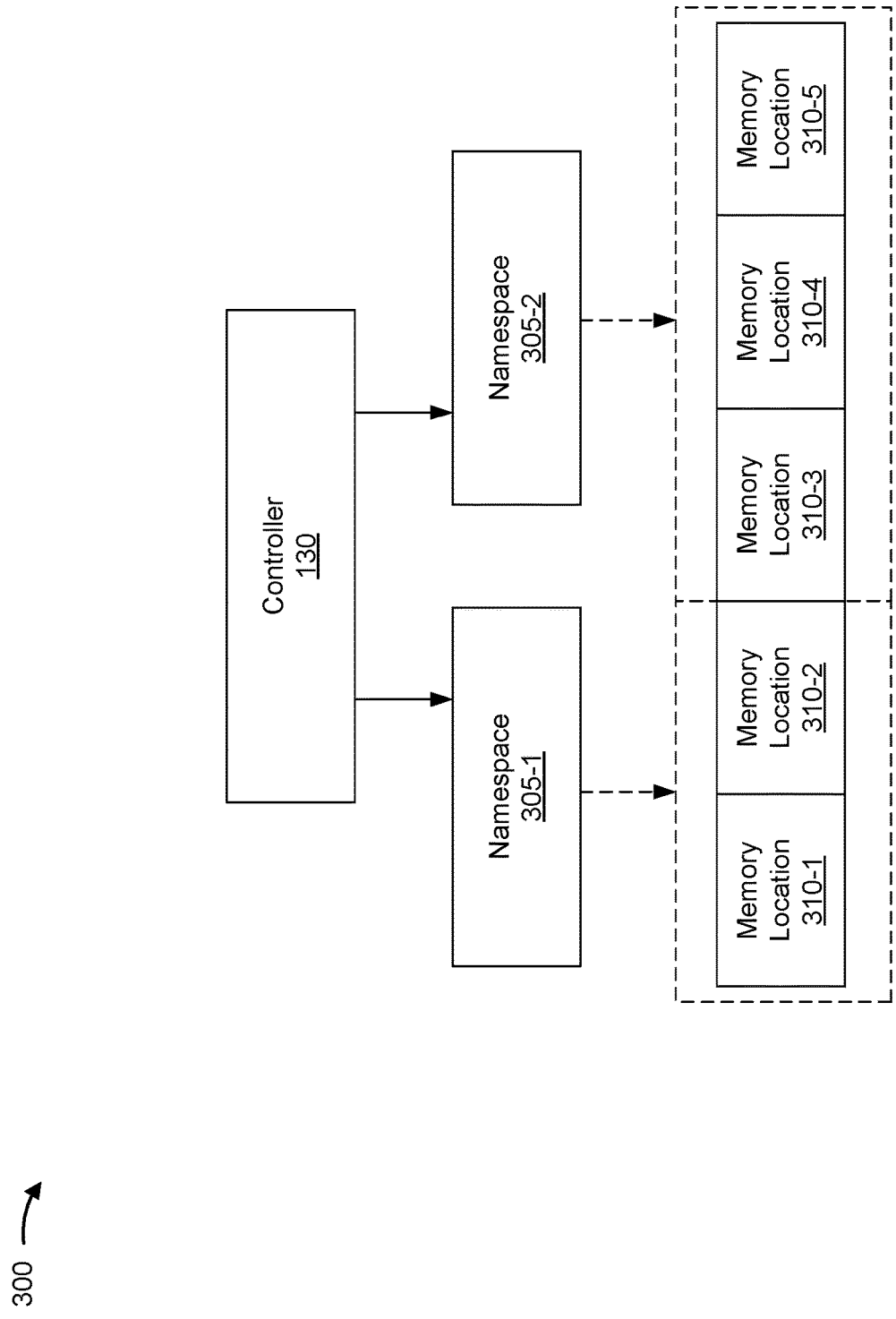
FIG. 3 is a diagram illustrating an example of shared namespace memory allocation.

FIG. 3 is a diagram illustrating an example 300 of shared namespace memory allocation. In some cases, one or more memory locations (e.g., one or more memory cells, pages, sub-blocks, blocks, or planes, among other examples) of the memory device 120 may be associated with one or more namespaces. The different memory locations of the memory device 120 may be configured independently from each other within the respective namespaces. For example, the memory locations associated with a first namespace may have a first configuration and/or may be associated with a first functionality of the memory device 120, and the memory locations associated with a second namespace may have a second configuration and/or may be associated with a second functionality of the memory device 120.

In some cases, after the one or more memory locations of the memory device 120 are allocated to the namespace, a logical block address (LBA) in the respective namespace may logically represent the one or more memory locations within the namespace. An LBAs may be used in different namespaces to identify different memory locations in different portions of the memory device 120. For example, a first namespace that is associated with a first portion of the memory device 120 having n memory units may have LBAs ranging from 0 to n−1, and a second namespace that is associated with a second portion of the memory device 120 having m memory units may have LBAs ranging from 0 to m−1. In some cases, the memory device 120 may be divided into blocks of LBAs according to a block size. A block-by-block namespace mapping may allow the allocation of non-contiguous LBAs of the memory device 120 to a namespace, which may reduce fragmentation of the memory capacity caused by cycles of namespace allocation and deletion, and may improve efficiency in the usage of the memory capacity.

As described herein, a namespace may isolate the memory locations within the namespace from other memory locations of the memory device 120. In some cases, only one host device 110 may be able to access a particular namespace at a time. As shown in the example 300, memory location 310-1 and memory location 310-2 may be associated with Namespace 305-1, and memory location 310-3, memory location 310-4, and memory location 310-5 may be associated with Namespace 305-2. In one example, the controller 130 may receive a request from a first host device 110 for exclusive access to the memory locations within Namespace 305-1. The controller 130 may grant the first host device exclusive access to the memory locations within Namespace 305-1 (e.g., memory location 310-1 and memory location 310-2) and may lock the Namespace 305-1. Locking the Namespace 305-1 may include locking the LBA ranges associated with the Namespace 305-1. This may prevent the memory locations within Namespace 305-1 from being accessed by other host devices. For example, if a second host device 110 attempts to access Namespace 305-1 (or the memory locations associated with Namespace 305-1) while the Namespace 305-1 is locked, the second host device may receive an error message. This may prevent the data that is stored within the memory locations of Namespace 305-1 from being corrupted. As described above, an entire LBA range associated with a namespace may be inefficient, particularly when the host device only needs to access a small portion of the memory locations (such as one or more resources) within the namespace. This may result in wasted resources of the memory device 120. For example, other host devices may not be able to access resources of the memory device 120 that are included in the namespace, even when those particular resources are not being used by the host device 110.

As indicated above, FIG. 3 is provided as an example. Other examples may differ from what is described with regard to FIG. 3.

FIG. 4 is a diagram illustrating an example 400 of selective data map unit access. A plurality of host devices 405 may access a non-volatile memory (NVM) subsystem 410. The host devices 405 may respectively include some or all of the features of the host device 110. The NVM subsystem 410 may include one or more controllers 415, one or more namespace identifiers (NSIDs) 420 that are respectively associated with the one or more controllers 415, a shared namespace component 425, and a resource sharing component 430 (e.g., an RWLOCK component).

In some implementations, one or more host devices 405 may be associated with different functionalities of a primary device. For example, the host device 405-1, host device 405-2, and host device 405-3 may be associated with a primary device, such as an automobile. The host device 405-1 may be associated with a first functionality associated with the primary device, such as a back-up camera associated with the automobile, the host device 405-2 may be associated with a second functionality of the primary device, such as a cruise control functionality of the automobile, and the host device 405-3 may be associated with a third functionality of the primary device, such as an alert system associated with the automobile. The host device 405-1, host device 405-2, and the host device 405-3 may need to share information associated with the primary device, such as a speed or a directionality of the automobile. The host devices 405 may share access to the information using the shared namespace component 425 and/or the resource sharing component 430.

In some implementations, the one or more controllers 415 may be associated with one or more of the host devices 405. For example, a first controller 415-1 and a second controller 415-2 may be associated with the host device 405-1, a third controller 415-3 may be associated with the host device 405-2, and a fourth controller 415-4 may be associated with the host device 405-3. Each of the controllers may be configured to carry out one or more functions associated with the respective host device. For example, the first controller 415-1 and the second controller 415-2 may be configured to execute one or more functions of the host device 405-1. In the example above, the first controller 415-1 may be configured to detect whether the automobile is in reverse (e.g., in a back-up state), and the second controller 415-2 may be configured to generate an alert signal based on the back-up camera detecting an object within a threshold distance of the automobile.

In some implementations, each of the controllers 415 may be associated with an NSID 420. The NSID 420 may be used for accessing information that is shared by the plurality of host devices 405, such as information that is managed (e.g., controlled) by the shared namespace component 425 and/or the resource sharing component 430. For example, the first controller 415-1 may be configured to access the shared information for the host device 405-1 using NSID 420-1, the second controller 415-2 may be configured to access the shared information for the host device 405-1 using NSID 420-2, the third controller 415-3 may be configured to access the shared information for the host device 405-2 using NSID 420-3, and the fourth controller 415-4 may be configured to access the shared information for the host device 405-3 using NSID 420-4. In some implementations, accessing the shared information may include accessing information via the shared namespace component 425 and/or the resource sharing component 430 using the respective NSID 420 associated with the controller 415 that is accessing the shared information.

As described herein, a shared namespace component, such as the shared namespace component 425, may control access to one or more memory locations associated with the shared namespace. For example, the shared namespace component 425 may receive a request from the host device 405-1 to access one or more memory locations associated with the shared namespace. The shared namespace component 425 may determine whether the host device 405-1 may access the memory locations associated with the shared namespace. For example, the shared namespace component 425 may allow the host device 405-1 to access the memory locations associated with the shared namespace based on the LBA ranges associated with the shared namespace being in an unlocked state. Alternatively, the shared namespace component 425 may not allow the host device 405-1 to access the memory locations associated with the shared namespace based on the LBA ranges associated with the shared namespace being in a locked state. As described herein, locking the shared namespace, such as locking the LBA ranges associated with the shared namespace, may be inefficient. For example, locking the LBA ranges associated with the shared namespace may include locking multiple GBs of data, even though the host device 405-1 may only need access to a portion of the shared namespace.

The resource sharing component 430 may be configured to lock and/or unlock one or more data map units that are shared by the plurality of host devices 405. Locking a data map unit may include locking access to a resource (e.g., a file) associated with the data map unit, and unlocking the data map unit may include unlocking access to the resource (e.g., the file) associated with the data map unit. In some implementations, the resource sharing component 430 may receive a request from the host device 405-1 to access a file that is shared by the host device 405-1 and one or more other host devices, such as the host device 405-2 and/or the host device 405-3. The file may include information associated with the primary device, such as the automobile in the example above. The resource sharing component 430 may determine whether the data map unit associated with the file is in a locked state or an unlocked state. The resource sharing component 430 may be configured to grant the host device 405-1 access to the file based on the data map unit being in an unlocked state. For example, the resource sharing component 430 may grant the host device 405-1 exclusive access to the file, and may lock the data map unit from being accessed by other host devices 405, based on the data map unit being in the unlocked state. Alternatively, the resource sharing component 430 may deny the host device 405-1 access to the file, or may add the request for the access to the file by the host device 405-1 to a queue, based on the data map unit being in the locked state. In some implementations, the resource sharing component 430 may associate an identifier of the host device 405-1 with the data map unit based on granting the host device 405-1 exclusive access to the resource. For example, the resource sharing component 430 may store an identifier of the host device 405-1 (e.g., Host ID A) with a lock associated with the data map unit based on granting the host device 405-1 exclusive access to the resource.

In some implementations, the resource sharing component 430 may be configured to add the request for exclusive access to the resource to a queue based on the data map unit being in the locked state and based on the queue being in the available state. Alternatively, the resource sharing component 430 may be configured to deny the request for exclusive access to the resource based on the data map unit being in the locked state and based on the queue being in the full state. In one example, the resource sharing component 430 may receive a request from the host device 405-1 for exclusive access to a select resource. The resource sharing component 430 may detect that the data map unit associated with the select resource is in the locked state. Based on detecting that the select data map unit is in the locked state, the resource sharing component 430 may determine a status of the queue. The resource sharing component 430 may deny the host device 405-1 exclusive access to the select resource based on the queue being in the full state. Alternatively, the resource sharing component 430 may add the request for exclusive access to the select resource to the queue based on the queue not being in the full state. In this case, the resource sharing component 430 may increment a counter associated with the queue. For example, if the counter currently has a current value of c, the resource sharing component may change the value of the counter to c+1. Additionally, or alternatively, the resource sharing component 430 may lock the data map unit associated with the select resource from being accessed by other host devices 405.

In some implementations, the resource sharing component 430 may receive a request from another host device to access the resource. For example, the resource sharing component 430 may receive a request from the host device 405-2 to access the resource while the host device 405-1 currently has exclusive access to the resource. The resource sharing component 430 may deny the host device 405-2 the access to the resource, or may add the request for the access to the resource by the host device 405-2 to the queue, based on the host device 405-1 currently having exclusive access to the resource.

In some implementations, the resource sharing component 430 may receive a request from the host device 405-1 to release exclusive access to the resource. The resource sharing component 430 may release exclusive access to the resource by the host device 405-1 based on receiving the request from the host device 405-1 to release exclusive access to the resource. The resource sharing component 430 may set the data map unit to the unlocked state based on releasing exclusive access to the resource by the host device 405-1. The data map unit may be available to be accessed by other host devices, such as the host device 405-2 and/or the host device 405-3, based on the resource sharing component 430 releasing exclusive access to the resource by the host device 405-1.

In some implementations, the resource sharing component 430 may generate a key based on granting an exclusive access to a resource. For example, the resource sharing component 430 may receive a request from the host device 405-1 for exclusive access to the resource and may determine that the data map unit is in an unlocked state. The resource sharing component 430 may generate a key, and may transmit an indication of the key to the host device 405-1 based on granting the host device 405-1 exclusive access to the resource. In some implementations, the key may be based on an identifier associated with the host device 405-1 and/or an identifier associated with the data map unit or the corresponding resource. In some implementations, the host device 405-1 may request to release exclusive access to the resource. The request to release exclusive access to the resource may include the key. In some implementations, the resource sharing component 430 may receive configuration information that indicates a total number of locks that are available for the plurality of data map units (e.g., the plurality of data map units included in the data map). In some implementations, the resource sharing component 430 may receive a request to transmit an indication of all host devices 405 (and/or the identifiers associated with the host devices 405) that currently have exclusive access to one or more data map units, and may transmit an indication based on the request that includes the identifiers associated with the host devices 405 and/or the identifiers associated with the data map units. In some implementations, the resource sharing component 430 may receive an indication from a select host device (e.g., a superuser (SU)), such as host device 405-2, to release exclusive access to one or more data map units by another host device, such as host device 405-1. Additional details regarding these features are described below.

In some implementations, the resource sharing component 430 may be implemented as a separate PCIe device. For example, the resource sharing component 430 (e.g., the RWLOCK component) may be implemented as a separate PCIe device even though the resource sharing component 430 is physically built-in to the NVMe SSD. The resource sharing component 430 may be a small RAM storage device, or may include a small RAM storage device, such as a PCIe base access register (BAR) (or a portion thereof), that is capable of being used by any device that is on the PCIe tree, such as any host device 405 that has access to the shared memory for data map unit sharing. In some implementations, the resource sharing component 430 may only be visible to the shared namespaces. In some implementations, the resource sharing component 430 may be a dedicated RAM region that can be accessed via dedicated NVMe command protocols. The visibility of the resource sharing component 430 may be limited to the host devices 405, such as all of the host devices (or some of the host devices) that have access to the shared namespace component 425. Additional details regarding these features are described in connection with FIG. 5.

In some implementations, the resource sharing component 430 may be configured to transmit and/or receive one or more of the following example commands: RWLOCK INIT, RWLOCK SET EXCLUSIVE, RWLOCK HOLDER LIST, RWLOCK CLEAR, and SU-RWLOCK CLEAR. The example commands may be NVMe commands.

The RWLOCK INIT command may indicate configuration information associated with the resource sharing component 430. In some implementations, the RWLOCK INIT command may indicate a total number of locks associated with the resource sharing component 430. For example, the RWLOCK INIT command may indicate a total number of locks that are available for the plurality of data map units that are managed by the resource sharing component 430. The total number of locks may be based on the RAM capacity associated with the resource sharing component 430. In some implementations, the RWLOCK INIT command may indicate that a select host device 405 is to operate as the SU NVMe controller. The select host device 405 that is to operate as the SU NVMe controller may not be able to be changed during a power cycle (e.g., cannot be changed until a next power cycle). In some implementations, the RWLOCK INIT command may be used to indicate a command queue depth.

In some implementations, the RWLOCK SET EXCLUSIVE command may associate a host device ID with a select lock number. For example, the RWLOCK SET EXCLUSIVE command may associate the Host ID A (associated with the host device 405-1) with a lock number for a data map unit that is currently being accessed (exclusively) by the host device 405-1. In some implementations, the host ID may be provided as an argument together with the lock number (RWLOCK number). If the lock is free, the RWLOCK SET EXCLUSIVE command may result in the host identifier being associated with the lock number. Otherwise, the command may be queued. In another example, if the queue is full, the command may result in an error indication being issued. In some implementations, a pass command may return the key to be used for the RWLOCK CLEAR command (described below) with the controller identifier, and the lock number may be increased by one.

The RWLOCK HOLDER LIST command may return the host device identifiers that are currently associated with each of the locks that are currently in use. For example, based on the host device 405-1 having exclusive access to a first data map unit (data map unit 1) and the host device 405-2 having exclusive access to a second data map unit (data map unit 2), the RWLOCK HOLDER LIST command may indicate that the Host ID A is associated with data map unit 1 and that Host ID B is associated with data map unit 2.

The RWLOCK CLEAR command may be used by a host device 405 to clear an association between the respective host device 405 and a lock for a data map unit. For example, the host device 405-1 may receive exclusive access to data map unit 1 (using one or more of the commands described above) and may clear exclusive access to the resource 1 using the RWLOCK CLEAR command. In some implementations, the host device 405-1 may clear the lock for the data map unit 1 using a key that was issued when the RWLOCK SET EXCLUSIVE for the data map unit 1 was granted.

The SU-RWLOCK CLEAR command may enable the SU to clear one or more locks that are currently granted for one or more data map units. For example, based on the host device 405-2 being the SU, and based on the host device 405-1 having an exclusive access to the data map 1, the host device 405-2 may issue the SU-RWLOCK CLEAR command to remove exclusive access to the data map 1 by the host device 405-1. This may enable the SU to manage the locks in order to avoid starvation of the system. In one example, the host device 405-1 may enter a fail state while the host device 405-1 has an exclusive access to the data map unit 1. This may prevent the data map unit 1 from being accessed by any of the other host devices. In this example, the host device 405-2 (acting as the SU) may remove exclusive access to the data map 1 1 by the host device 405-1, which may enable other devices (such as the host device 405-3) to access the data map unit 1.

As described herein, a select namespace may isolate the memory locations within the namespace from other memory locations of the memory device 120. In some cases, only one host device 405 may be able to access a particular namespace at a given time. In one example, a controller 130 associated with the memory device 120 may receive a request from a first host device 405-1 for exclusive access to the memory locations within a first namespace. The controller 130 may grant the first host device 405-1 exclusive access to memory locations associated with the first namespace, and may lock the first namespace. Locking the first namespace may include locking the LBA ranges associated with the memory locations within the first namespace. This may prevent the memory locations within the first namespace from being accessed by other host devices 405. For example, if a second host device 405-2 attempts to access the first namespace (or the memory locations associated with the first namespace) while the first namespace is locked, the second host device 405-2 may receive an error message. This may prevent the data that is stored within the memory locations of the first namespace from being corrupted. However, locking LBA ranges of the memory device 120 may require a high level of complexity. Additionally, namespaces may correspond to large portions of memory, such as multiple gigabytes (GBs) of memory. Locking an entire LBA range associated with a namespace may be inefficient, particularly when the host device 405 only needs to access a small portion of the memory locations (such as one or more data map units) within the namespace. This may result in wasted resources of the memory device 120, such as in applications where simultaneous data map unit and metadata access is necessary.

Some implementations described herein enable selective data map unit access for the memory device 120. The memory device 120 may selectively lock and unlock access to data map units of a data map that is shared by a plurality of host devices 405. In some implementations, the memory device 120, such as the resource sharing component 430 associated with the memory device 120, may receive a request from a host device 405-1 to access a resource associated with a data map unit, and may identify whether the data map unit is in a locked state or an unlocked state. The data map unit may be in the locked state when another host device 405 currently has exclusive access to the resource or may be in the unlocked state when no other host device 405 currently has exclusive access to the resource. The memory device 120 may selectively grant the host device 405-1 exclusive access to the resource based on identifying whether the data map unit is in the locked state or the unlocked state. For example, the memory device 120 may grant the host device 405-1 exclusive access to the resource based on the memory device 120 identifying that the data map unit is in the unlocked state. Granting the host device 405-1 exclusive access to the resource may include setting the data map unit to the locked state while the host device 405-1 has exclusive access to the resource. Alternatively, the memory device 120 may deny the host device 405-1 exclusive access to the resource, or may add the request for exclusive access to the resource to a queue, based on the memory device 120 identifying that the data map unit is in the locked state.

Using the techniques described herein, the memory device 120 may lock access to one or more data map units associated with one or more files (or portions of one or more files). Locking the access to the data map unit, rather than locking the LBA ranges themselves, may allow more host devices 405 to access the resource and may improve (e.g., reduce) the access time for the host devices 405 to access the resource. The techniques described herein may provide an alternative solution for data and metadata synchronization for systems that do not support TCP/IP protocols. Additionally, or alternatively, the techniques described herein may be considered as a redundant mechanism. For example, a system may implement both namespace LBA locking and the data map unit sharing techniques described herein to enable shared access to resources between the plurality of host devices 405.

As indicated above, FIG. 4 is provided as an example. Other examples may differ from what is described with regard to FIG. 4.

FIG. 5 is a diagram illustrating an example of a system 500 for selective data map unit access. The system 500 may include a CPU 505, a DRAM 510, and one or more NVMe components 520 associated with one or more respective SSDs 525. The CPU 505 may communicate with the DRAM using the DDR interface 515. The NVMe components 520 may communicate using a PCIe interface 530. For example, the NVMe component 520-1 associated with the SSD 525-1 may communicate with the NVMe component 520-2 associated with the SSD 525-2 using the PCIe 530. As shown in FIG. 5, and as described herein, the resource sharing component 430 may be implemented as a separate PCIe device. For example, the resource sharing component 430 (e.g., the RWLOCK component) may be implemented as a separate PCIe device even though the resource sharing component 430 is physically built-in to the NVMe SSD. The resource sharing component 430 may be a small RAM storage device, or may include a small RAM storage device, such as a PCIe base access register (BAR) (or a portion thereof), that is capable of being used by any device that is on the PCIe tree, such as any host device 405 that has access to the shared memory for data map unit sharing. In some implementations, the resource sharing component 430 may be a dedicated RAM region that can be accessed via dedicated NVMe command protocols. The visibility of the resource sharing component 430 may be limited to the host devices 405, such as all of the host devices (or some of the host devices) that have access to the shared namespace component 425.

As indicated above, FIG. 5 is provided as an example. Other examples may differ from what is described with regard to FIG. 5.

Figure 6:
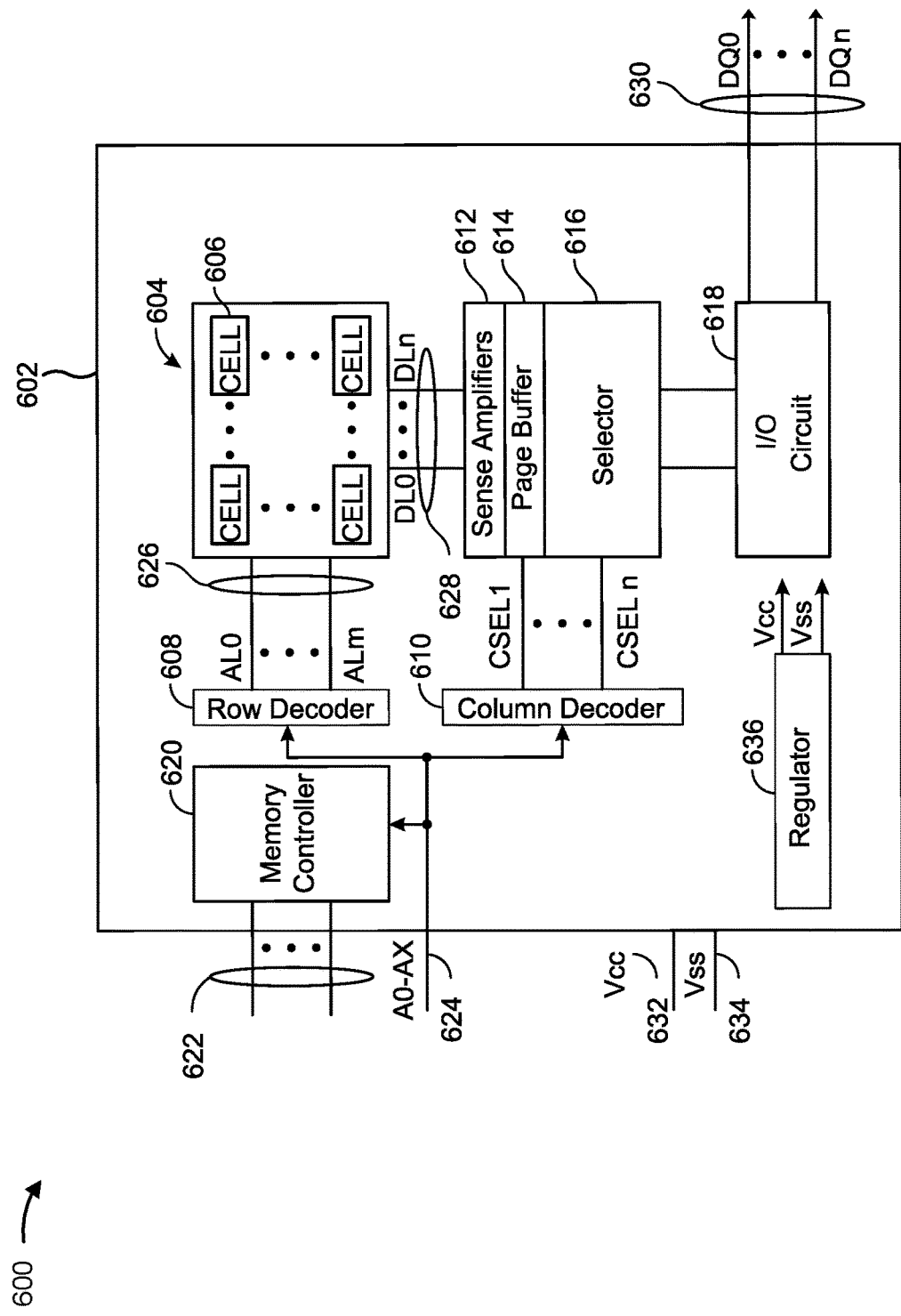
FIG. 6 is a diagram illustrating an example of components included in a memory device.

FIG. 6 is a diagram illustrating an example 600 of components included in a memory device 602. The memory device 602 may be the memory device 120. The memory device 602 may include a memory array 604 having multiple memory cells 606. The memory device 602 may include one or more components (e.g., circuits) to transmit signals to or perform memory operations on the memory array 604. For example, the memory device 602 may include a row decoder 608, a column decoder 610, one or more sense amplifiers 612, a page buffer 614, a selector 616, an input/output (I/O) circuit 618, and a memory controller 620. The memory controller 620 may be the controller 130.

The memory controller 620 may control memory operations of the memory device 602 according to one or more signals received via one or more control lines 622, such as one or more clock signals or control signals that indicate an operation (e.g., write, read, or erase) to be performed. Additionally, or alternatively, the memory controller 620 may determine one or memory cells 606 upon which the operation is to be performed based on one or more signals received via one or more address lines 624, such as one or more address signals (shown as A0-AX). A host device external from the memory device 602 may control the values of the control signals on the control lines 622 and/or the address signals on the address line 624.

The memory device 602 may use access lines 626 (sometimes called word lines or row lines, and shown as AL0-ALm) and data lines 628 (sometimes called digit lines, bit lines, or column lines, and shown as DL0-DLn) to transfer data to or from one or more of the memory cells 606. For example, the row decoder 608 and the column decoder 610 may receive and decode the address signals (A0-AX) from the address line 624 and may determine which of the memory cells 606 are to be accessed based on the address signals. The row decoder 608 and the column decoder 610 may provide signals to those memory cells 606 via one or more access lines 626 and one or more data lines 628, respectively.

For example, the column decoder 610 may receive and decode address signals into one or more column select signals (shown as CSEL1-CSELn). The selector 616 may receive the column select signals and may select data in the page buffer 614 that represents values of data to be read from or to be programmed into memory cells 606. The page buffer 614 may be configured to store data received from a host device before the data is programmed into relevant portions of the memory array 604, or the page buffer 614 may store data read from the memory array 604 before the data is transmitted to the host device. The sense amplifiers 612 may be configured to determine the values to be read from or written to the memory cells 606 using the data lines 628. For example, in a selected string of memory cells 606, a sense amplifier 612 may read a logic level in a memory cell 606 in response to a read current flowing through the selected string to a data line 628. The I/O circuit 618 may transfer values of data into or out of the memory device 602 (e.g., to or from a host device), such as into or out of the page buffer 614 or the memory array 604, using I/O lines 630 (shown as (DQ0-DQn)).

The memory controller 620 may receive positive and negative supply signals, such as a supply voltage (Vcc) 632 and a negative supply (Vss) 634 (e.g., a ground potential), from an external source or power supply (e.g., an internal battery, an external battery, and/or an AC-to-DC converter). In some implementations, the memory controller 620 may include a regulator 636 to internally provide positive or negative supply signals.

One or more devices or components shown in FIG. 6 may be used to carry out operations described elsewhere herein, such as one or more operations of FIGS. 4-5 and/or one or more process blocks of the methods of FIG. 7.

As indicated above, FIG. 6 is provided as an example. Other examples may differ from what is described with regard to FIG. 6.

FIG. 7 is a flowchart of an example method 700 associated with selective data map unit access. In some implementations, a memory device (e.g., memory device 120) may perform or may be configured to perform one or more process blocks of FIG. 7. In some implementations, another device or a group of devices separate from or including the memory device (e.g., the system 100 and/or the host device 110) may perform or may be configured to perform one or more process blocks of FIG. 7. Additionally, or alternatively, one or more components of the memory device (e.g., the controller 130 and/or the locking component 270) may perform or may be configured to perform one or more process blocks of FIG. 7.

As shown in FIG. 7, the method 700 may include receiving a request from a host device to access a resource associated with a data map unit (block 710). As further shown in FIG. 7, the method 700 may include identifying whether the data map unit is in a locked state or an unlocked state (block 720). The data map unit may be in the locked state when another host device currently has exclusive access to the resource or may be in the unlocked state when no other host device currently has exclusive access to the resource. As further shown in FIG. 7, the method 700 may include selectively granting the host device exclusive access to the resource based on identifying whether the data map unit is in the locked state or the unlocked state (block 730). Granting the host device exclusive access to the resource may include setting the data map unit to the locked state while the host device has exclusive access to the resource.

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIG. 4.

In some implementations, a memory device includes one or more components configured to: receive a request from a host device to access a resource associated with a data map unit, wherein the data map unit is included in a data map that includes a plurality of data map units, each data map unit corresponding to a resource or a portion of a resource; identify whether the data map unit is in a locked state or an unlocked state, wherein the data map unit is in the locked state when another host device currently has exclusive access to the resource or is in the unlocked state when no other host device currently has exclusive access to the resource; and selectively grant the host device exclusive access to the resource based on identifying whether the data map unit is in the locked state or the unlocked state, wherein granting the host device exclusive access to the resource comprises setting the data map unit to the locked state while the host device has exclusive access to the resource.

In some implementations, a system comprising: a memory device configured to: receive a request from a host device to access a resource associated with a data map unit, wherein the data map unit is included in a data map that includes a plurality of data map units, each data map unit corresponding to a resource or a portion of a resource; identify whether the data map unit is in a locked state or an unlocked state, wherein the data map unit is in the locked state when another host device currently has exclusive access to the resource or is in the unlocked state when no other host device currently has exclusive access to the resource; and selectively grant the host device exclusive access to the resource based on identifying whether the data map unit is in the locked state or the unlocked state; and the host device, wherein the host device is configured to: transmit the request to the memory device to access the data map unit associated with the resource; and selectively access the data map unit based on the memory device selectively granting the host device exclusive access to the resource.

In some implementations, a method comprising: receiving a non-volatile memory express command from a host device that includes a request to access a resource associated with a data map unit, wherein the data map unit is included in a data map that includes a plurality of data map units, each data map unit corresponding to a resource or a portion of a resource; identifying whether the data map unit is in a locked state or an unlocked state, wherein the data map unit is in the locked state when another host device currently has exclusive access to the resource or is in the unlocked state when no other host device currently has exclusive access to the resource; granting the host device exclusive access to the resource based on identifying that the data map unit is in the unlocked state; and setting the data map unit to the locked state while the host device has exclusive access to the resource.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, the terms "substantially" and "approximately" mean "within reasonable tolerances of manufacturing and measurement." As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
one or more components configured to:
receive a request from a host device to access a resource associated with a data map unit,
wherein the data map unit is included in a data map that includes a plurality of data map units, each data map unit corresponding to a resource or a portion of a resource;
receive configuration information that indicates a total number of locks that are available for the plurality of data map units;
identify whether the data map unit is in a locked state or an unlocked state,
wherein the data map unit is in the locked state when another host device currently has exclusive access to the resource or is in the unlocked state when no other host device currently has exclusive access to the resource; and
selectively grant the host device exclusive access to the resource based on identifying whether the data map unit is in the locked state or the unlocked state,
wherein granting the host device exclusive access to the resource comprises setting the data map unit to the locked state while the host device has exclusive access to the resource.

2. The memory device of claim 1, wherein the one or more components, to selectively grant the host device exclusive access to the resource, are configured to grant the host device exclusive access to the resource based on identifying that the data map unit is in the unlocked state.

3. The memory device of claim 1, wherein the one or more components are configured to add the request to a queue, and to increase a lock number associated with the data map unit by an increment, based on identifying that the data map unit is in the locked state.

4. The memory device of claim 1, wherein the one or more components, to selectively grant the host device exclusive access to the resource, are configured to deny the host device exclusive access to the resource based on identifying that the data map unit is in the locked state and based on a queue associated with the data map unit being in a full state.

5. The memory device of claim 1, wherein the one or more components are configured to:
receive a request from another host device to access the resource; and
determine not to grant the other host device exclusive access to the resource based on granting the host device exclusive access to the resource and based on setting the data map unit to the locked state.

6. The memory device of claim 1, wherein the one or more components are configured to:
receive a request to release exclusive access to the resource by the host device;
release exclusive access to the resource by the host device based on receiving the request to release exclusive access to the resource by the host device; and
set the data map unit to the unlocked state based on releasing exclusive access to the resource by the host device.

7. The memory device of claim 6, wherein setting the data map unit to the unlocked state enables exclusive access to the resource by another host device.

8. The memory device of claim 6, wherein the one or more components, to grant the host device exclusive access to the resource, are configured to transmit a key to the host device, and wherein the one or more components, to receive the request from the host device to release exclusive access to the resource, are configured to receive the key from the host device.

9. The memory device of claim 1, wherein the one or more components are configured to receive an indication from another host device to release exclusive access to the resource by the host device.

10. The memory device of claim 1, wherein the one or more components are configured to:
receive a request to identify one or more host devices that have exclusive access to one or more data map units of the plurality of data map units; and
transmit an indication of the one or more host devices that have exclusive access to the one or more data map units.

11. The memory device of claim 1, wherein the memory device is a non-volatile memory express (NVMe) and peripheral component interconnect express capable device, and wherein the one or more components, to receive the request from the host device to access the resource, are configured to receive an NVMe command from the host device that includes the request to access the resource.

12. A system comprising:
a memory device configured to:
- receive a request from a host device to access a resource associated with a data map unit,
  - wherein the data map unit is included in a data map that includes a plurality of data map units, each data map unit corresponding to a resource or a portion of a resource;
- receive configuration information that indicates a total number of locks that are available for the plurality of data map units;
- identify whether the data map unit is in a locked state or an unlocked state,
  - wherein the data map unit is in the locked state when another host device currently has exclusive access to the resource or is in the unlocked state when no other host device currently has exclusive access to the resource; and
- selectively grant the host device exclusive access to the resource based on identifying whether the data map unit is in the locked state or the unlocked state; and the host device, wherein the host device is configured to:
- transmit the request to the memory device to access the resource; and
- selectively access the resource based on the memory device selectively granting the host device exclusive access to the resource.

13. The system of claim 12, wherein the memory device, to selectively grant the host device exclusive access to the resource, is configured to grant the host device exclusive access to the resource based on identifying that the data map unit is in the unlocked state, wherein granting the host device exclusive access to the resource comprises setting the data map unit to the locked state while the host device has exclusive access to the resource.

14. The system of claim 12, wherein the memory device is configured to add the request to a queue, and to increase a lock number associated with the data map unit by an increment, based on identifying that the data map unit is in the locked state.

15. The system of claim 12, wherein the memory device, to selectively grant the host device exclusive access to the resource, is configured to deny the host device exclusive access to the resource based on identifying that the data map unit is in the locked state and based on a queue associated with the data map unit being in a full state.

16. The system of claim 12, wherein the memory device is configured to:
- receive a request to release exclusive access to the resource by the host device;
- release exclusive access to the resource by the host device based on receiving the request to release exclusive access to the resource by the host device; and
- set the data map unit to the unlocked state based on releasing exclusive access to the resource by the host device.

17. The system of claim 16, wherein the memory device, to grant the host device exclusive access to the resource, is configured to transmit a key to the host device, and wherein the memory device, to receive the request from the host device to release exclusive access to the resource, is configured to receive the key from the host device.

18. The system of claim 12, wherein the memory device is configured to receive an indication from another host device to release exclusive access to the resource by the host device.

19. The system of claim 12, wherein the memory device is configured to:
- receive a request to identify one or more host devices that have exclusive access to one or more data map units of the plurality of data map units; and
- transmit an indication of the one or more host devices that have exclusive access to the one or more data map units.

20. A method comprising:
- receiving a non-volatile memory express command from a host device that includes a request to access a resource associated with a data map unit,
  - wherein the data map unit is included in a data map that includes a plurality of data map units, each data map unit corresponding to a resource or a portion of a resource;
- receiving configuration information that indicates a total number of locks that are available for the plurality of data map units;
- identifying whether the data map unit is in a locked state or an unlocked state,
  - wherein the data map unit is in the locked state when another host device currently has exclusive access to the resource or is in the unlocked state when no other host device currently has exclusive access to the resource;
- granting the host device exclusive access to the resource based on identifying that the data map unit is in the unlocked state; and
- setting the data map unit to the locked state while the host device has exclusive access to the resource.

21. The method of claim 20, further comprising:
- receiving a request from another host device to access the resource; and
- determining not to grant the other host device exclusive access to the resource based on granting the host device exclusive access to the resource and based on setting the data map unit to the locked state.

22. The method of claim 20, further comprising:
- receiving a request to release exclusive access to the resource by the host device;
- releasing exclusive access to the resource by the host device based on receiving the request to release exclusive access to the resource by the host device; and
- setting the data map unit to the unlocked state based on releasing exclusive access to the resource by the host device.

23. The method of claim 22, wherein granting the host device exclusive access to the resource comprises transmitting a key to the host device, and wherein receiving the request from the host device to release exclusive access to the resource comprises receiving the key from the host device.

24. The method of claim 22, wherein setting the data map unit to the unlocked state enables exclusive access to the resource by another host device.

25. The method of claim 20, further comprising receiving an indication from another host device to release exclusive access to the resource by the host device.

* * * * *